(12) United States Patent
Jeddeloh

(10) Patent No.: US 7,209,405 B2
(45) Date of Patent: Apr. 24, 2007

(54) MEMORY DEVICE AND METHOD HAVING MULTIPLE INTERNAL DATA BUSES AND MEMORY BANK INTERLEAVING

(75) Inventor: Joseph M. Jeddeloh, Shoreview, MN (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 11/064,543

(22) Filed: Feb. 23, 2005

(65) Prior Publication Data
US 2006/0190671 A1   Aug. 24, 2006

(51) Int. Cl.
G11C 8/00 (2006.01)

(52) U.S. Cl. .............................. 365/230.03; 365/230.04

(58) Field of Classification Search ........... 365/230.03, 365/230.04, 189.03, 189.04
See application file for complete search history.

(56) References Cited

U.S. PATENT DOCUMENTS

| | | | |
|---|---|---|---|
| 4,208,715 A | 6/1980 | Kumahara et al. ........... 364/200 |
| 4,503,497 A | 3/1985 | Krygowski et al. ......... 364/200 |
| 4,831,522 A | 5/1989 | Henderson et al. ......... 364/200 |
| 4,954,992 A | 9/1990 | Kumanoya et al. ......... 365/207 |
| 5,003,485 A | 3/1991 | Francisco ................... 364/478 |
| 5,202,856 A * | 4/1993 | Glider et al. ........... 365/230.05 |
| 5,278,957 A | 1/1994 | Chan ........................... 395/250 |
| 5,289,431 A | 2/1994 | Konishi ................. 365/230.03 |
| 5,369,619 A | 11/1994 | Ohba .................... 365/230.03 |
| 5,375,089 A | 12/1994 | Lo ........................ 365/189.04 |
| 5,384,745 A | 1/1995 | Konishi et al. ........ 365/230.03 |
| 5,517,462 A | 5/1996 | Iwamoto et al. ............. 365/233 |
| 5,539,691 A | 7/1996 | Kozaru et al. ......... 365/189.05 |
| 5,597,084 A | 1/1997 | Parasin ...................... 220/4.28 |
| 5,619,471 A * | 4/1997 | Nunziata ............... 365/230.03 |
| 5,745,732 A | 4/1998 | Cherukuri et al. .......... 395/495 |
| 5,847,998 A | 12/1998 | Van Buskirk .......... 365/185.33 |
| 5,856,947 A * | 1/1999 | Fang ..................... 365/189.01 |
| 5,925,118 A | 7/1999 | Revilla et al. .............. 710/110 |
| 5,991,223 A | 11/1999 | Kozaru et al. ......... 365/230.03 |
| 6,038,630 A | 3/2000 | Foster et al. ................ 710/132 |

(Continued)

OTHER PUBLICATIONS

Croucher, Phil, "Meaning Behind Ram RAS and CAS", http://www.kingston.com/tools/umg/umg03.asp, printed Feb. 24, 2006.

(Continued)

*Primary Examiner*—Anh Phung
(74) *Attorney, Agent, or Firm*—Dorsey & Whitney, LLP (57) ABSTRACT

A memory device and method receives write data through a unidirectional downstream bus and outputs read data through a unidirectional upstream bus. The downstream bus is coupled to a pair of internal write data buses, and the upstream bus is coupled to a pair of internal read data buses. A first set of multiplexers selectively couple each of the internal write data buses to any of a plurality of banks of memory cells. Similarly, a second set of multiplexers selectively couple each of the banks of memory cells to any of the internal read data buses. Write data can be coupled to one of the banks concurrently with coupling read data from another of the banks. Also, write data may be concurrently coupled from respective write data buses to two different banks, and read data may be concurrently coupled from two different banks to respective read data buses.

33 Claims, 6 Drawing Sheets

U.S. PATENT DOCUMENTS

| | | | |
|---|---|---|---|
| RE36,655 E | 4/2000 | Kozaru et al. | 365/189.05 |
| 6,061,763 A | 5/2000 | Rubin et al. | 711/129 |
| 6,081,458 A | 6/2000 | Lattimore et al. | 365/189.01 |
| 6,084,823 A | 7/2000 | Suzuki et al. | 365/233 |
| 6,091,662 A | 7/2000 | Mochida | 365/233 |
| 6,144,604 A | 11/2000 | Haller et al. | 365/221 |
| 6,167,475 A | 12/2000 | Carr | 710/113 |
| 6,195,280 B1 | 2/2001 | Lattimore et al. | 365/63 |
| 6,215,497 B1 | 4/2001 | Leung | 345/419 |
| 6,219,763 B1 | 4/2001 | Lentz et al. | 711/151 |
| 6,269,413 B1 | 7/2001 | Sherlock | 710/52 |
| 6,275,432 B1 | 8/2001 | Hardee | 365/205 |
| 6,278,644 B1 | 8/2001 | Takasugi | 365/221 |
| 6,282,588 B1 | 8/2001 | Yamamoto | 710/27 |
| 6,351,423 B2 | 2/2002 | Ooishi | 365/207 |
| 6,396,749 B2 | 5/2002 | Al-Shamma et al. | 365/200 |
| 6,442,646 B1 | 8/2002 | Tsuruta | 711/109 |
| 6,452,864 B1 * | 9/2002 | Condemi et al. | 365/233 |
| 6,510,161 B2 | 1/2003 | Trevitt et al. | 370/412 |
| 6,515,927 B2 | 2/2003 | Kitamoto et al. | 365/205 |
| 6,518,787 B1 | 2/2003 | Allegrucci et al. | 326/38 |
| 6,587,905 B1 | 7/2003 | Correale, Jr. et al. | 710/107 |
| 6,587,927 B2 | 7/2003 | Hotta et al. | 711/129 |
| 6,618,775 B1 | 9/2003 | Davis | 710/100 |
| 6,636,444 B2 | 10/2003 | Uchida et al. | 365/189.05 |
| 6,662,285 B1 | 12/2003 | Douglass et al. | 711/167 |
| 6,704,238 B2 | 3/2004 | Izutsu et al. | 365/230.03 |
| 6,717,624 B1 | 4/2004 | Kasai | 348/718 |
| 6,728,157 B2 | 4/2004 | Yagishita et al. | 365/222 |
| 2002/0023191 A1 | 2/2002 | Fudeyasu | 711/104 |

OTHER PUBLICATIONS

Definition of "The Memory Controller", PC Guide, http://www.pcguide.com/ref/ram/timingController-c.html, printed Aug. 2, 2006.

De Gelas, Johan, "Ace's Guide to Memory Technology", Ace's Hardware, Jul. 13, 2002, pp. 1-6, http://www.aceshardware.com/read.isp?id=5000172, printed Feb. 24, 2006.

"Dynamic Random Access Memory", Wikipedia, the free encyclopedia, pp. 1-7, http://en.wikipedia.org/wiki/Dynamic_Random_Access_Memory, printed Feb. 24, 2006.

"How Memory Works", Kingston Technology, pp. 1-8, http://www.Kingston.com/tools/umg/umg03.asp, printed Feb. 24, 2006.

Kent, Dean, "Ram Guide", Tom's Hardware, Oct. 24, 1998, p. 1, http://www.tomshardware.com/1998/10/24/ram_guide/page2.html, printed Feb. 24, 2006.

* cited by examiner

MEMORY DEVICE AND METHOD HAVING MULTIPLE INTERNAL DATA BUSES AND MEMORY BANK INTERLEAVING

FIELD OF THE INVENTION

The present invention relates to memory systems, and more particularly, to systems and methods for coupling command, address and data signals between a memory controller and one or more memory devices.

BACKGROUND OF THE INVENTION

Computer systems use memory devices, such as dynamic random access memory ("DRAM") devices, to store data that are accessed by a processor. These DRAM devices are normally used as system memory in a computer system. In a typical computer system, the processor communicates with the system memory through a processor bus and a memory controller. The system memory is typically arranged in memory modules each having multiple memory devices, and the memory modules are coupled through a memory bus to the memory controller. The processor issues a memory request, which includes a memory command, such as a read command, and an address designating the location from which data or instructions are to be read or to which data or instructions are to be written. The memory controller uses the command and address to generate appropriate command signals as well as row and column addresses, which are applied to the system memory through the memory bus. In response to the commands and addresses, data are transferred between the system memory and the processor. The memory controller is often part of a system controller, which also includes bus bridge circuitry for coupling the processor bus to an expansion bus, such as a PCI bus.

A high data bandwidth is a desirable capability of memory systems. Generally, bandwidth limitations are not related to the memory controllers since the memory controllers sequence data to and from the system memory as fast as the memory devices allow. One approach to increasing bandwidth is to increase the speed of the memory data bus coupling the memory controller to the memory devices. However, memory devices have not been able to keep up with increases in the data bandwidth of memory controllers and memory data buses. In particular, the memory controller must schedule all memory commands to the memory devices in a manner that allows the memory devices to respond to the commands. Although these hardware limitations can be reduced to some degree through the design of the memory device, a compromise must be made because reducing the hardware limitations typically adds cost, power, and/or size to the memory devices, all of which are undesirable alternatives. While memory devices can rapidly handle "well-behaved" accesses at ever increasing rates, for example, sequel traffic to the same page of a memory device, it is much more difficult for the memory devices to resolve "badly-behaved traffic," such as accesses to different pages of the memory device. As a result, the increase in memory data bus bandwidth does not result in a corresponding increase in the bandwidth of the memory system.

One approach to increasing the bandwidth of memory systems has been to use bank interleaving. In bank interleaving, two or more memory banks are accessed alternately so that preparations can be made to access data in one memory bank while data are being written to or read from another bank. The bandwidth of the memory system can be increased using this approach because it is not necessary to wait for memory access preparations like precharging to be completed before data can be coupled to or from the memory device. However, the memory bandwidth improvements that can be obtained with bank interleaving are limited by the inability to write to or read from multiple banks of memory at the same time. While preparations can be made to read from or write to a bank while data are being read from or written to another bank, it is not possible to actually couple the read data from or the write data to the bank until the access to the other bank has been completed.

An approach to increasing memory bandwidth that has some similarities to bank interleaving is memory device interleaving. In memory device interleaving, different memory devices are alternately accessed. As a result, preparations can be made to access one memory device while data is being read from or written to the other memory device. While memory device interleaving increases the memory bandwidth in a manner similar to the manner in which bank interleaving increases memory bandwidth, it suffers essentially the same limitations. In particular, it is not possible to actually couple the read data from or the write data to the memory device until the transfer of data to or from the other memory device has been completed.

In addition to the limited bandwidth of memory devices, the performance of computer systems is also limited by latency problems that increase the time required to read data from memory devices. More specifically, when a memory device read command is coupled to a system memory device, such as a synchronous DRAM ("SDRAM") device, the read data cannot be output from the SDRAM device until a delay of several clock periods has occurred. Although SDRAM devices can synchronously output burst data at a high data rate, the delay in initially providing the data can significantly slow the operating speed of a computer system using such SDRAM devices. These latency issues generally cannot by alleviated to any significant extent by simply increasing the memory data bus bandwidth.

The memory latency problem is greatly exacerbated by read accesses alternating with write accesses, a situation known as "read/write turnarounds." When a memory controller issues a read command to a memory device, the memory device must couple read data from a memory array to external data bus terminals of the memory device. The read data must then be coupled through a data bus portion of the memory bus from the memory device to the memory controller. It is only then that the memory controller can couple write data to the memory device through the data bus to initiate a write memory access.

Opening the page requires the coupling of memory command and a row address and a column address from the memory controller to the memory device. In response to the read address, the memory device must equilibrate the corresponding row, turn on access transistors for that row, and allow a sense amplifier for each column to sense the voltage that a respective memory cell couples to the sense amplifier. All of this can take a considerable period of time. For this reason, a read operations from a closed page and read/write turnarounds can prevent memory devices from even coming close to achieving the data bandwidths that are possible with high speed memory controllers and memory buses.

There is therefore a need for a memory device and memory system that allows a higher data bandwidth to be achieved.

SUMMARY OF THE INVENTION

A memory system is able to achieve a high bandwidth and low latency through the use of two separate data buses coupling a memory controller to one or more memory device. A downstream bus couples write data from the memory controller to each memory device, and an upstream bus couples read data from each memory device to the memory controller. As a result, read data can be coupled from each memory device to the memory controller at the same time that write data can be coupled from the memory controller to each memory device. The downstream memory bus may be used to couple memory commands and memory addresses to each memory device along with the write data. Each memory device may include dual internal write data buses that can concurrently transfer write data to different memory banks. Each memory device may also or alternatively include dual internal read data buses that can concurrently transfer read data to different memory banks. Furthermore, the write data buses may transfer write data to different banks at the same time that read data are being transferred to the read data buses from different banks.

DETAILED DESCRIPTION

Figure 1:
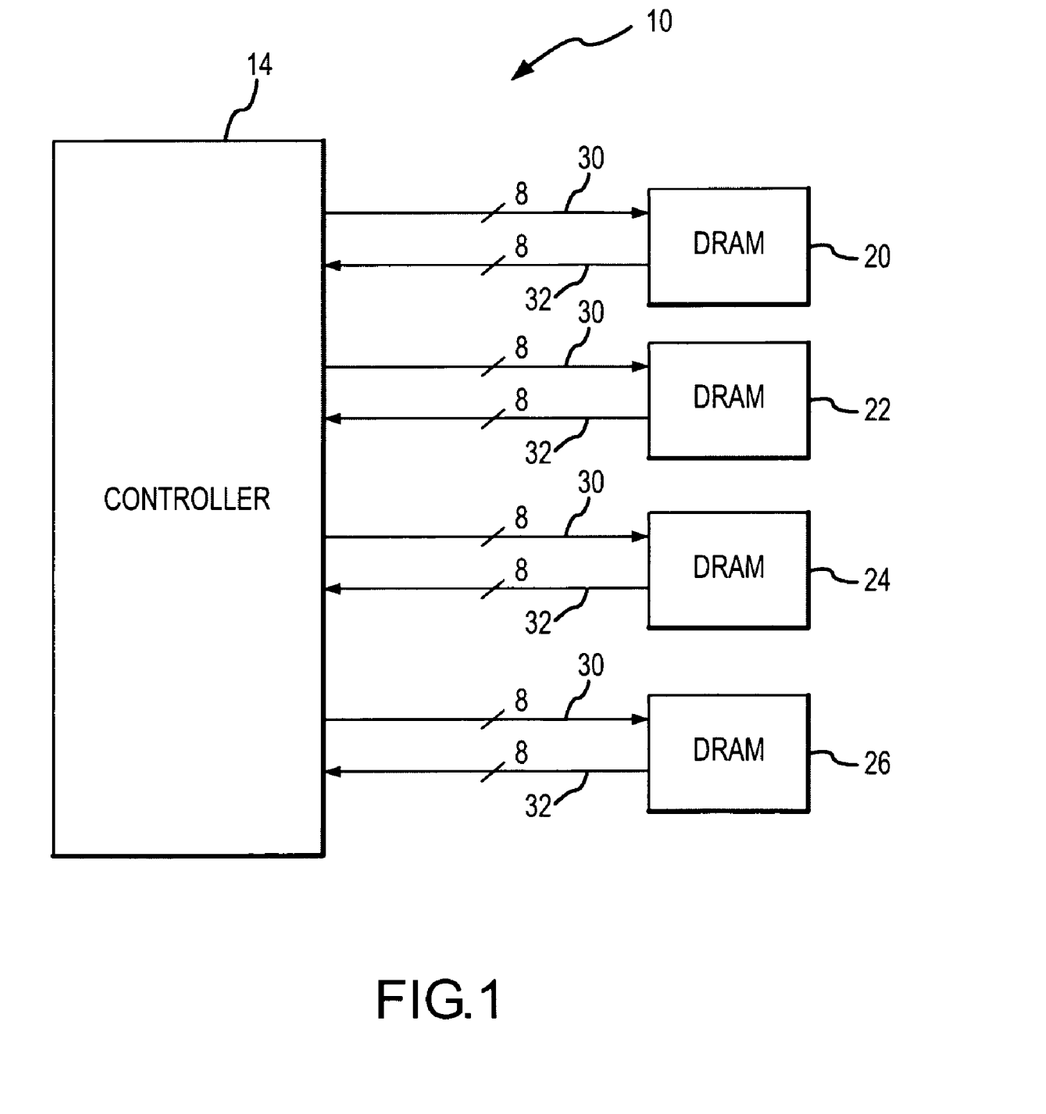
FIG. 1 is a block diagram of a memory system according to one example of the present invention.

A memory system 10 according to one example of the invention is illustrated in FIG. 1. The memory system 10 includes a memory controller 14 coupled to the four dynamic random access memory ("DRAM") devices 20, 22, 24, 26. The memory controller 14 is coupled to each of the DRAM devices 20–26 by an 8-bit write data bus 30 and an 8-bit read data bus 32. The memory controller 14 couples memory commands and memory addresses "downstream" to the DRAM devices 20–26 through either the write data bus 30, a separate command/address bus (not shown) or separate command and address buses (not shown). If the memory commands and memory addresses are coupled through the downstream bus, the commands and addresses may be in the form of a packet, which, for write commands, may also include write data.

In operation, the memory controller 14 couples write data "downstream" to the DRAM devices 20–26 through the write data bus 30, and the DRAM devices 20–26 couple read data "upstream" to the memory controller 14 through the read data bus 32. The bandwidth of the write data bus 30 may be the same as the bandwidth of the read data bus 32. Alternatively, the write data bus 30 and the read data bus 32 may have different bandwidths to accommodate different data rates through the buses 30, 32. By using separate write and read data buses 30, 32, respectively, the memory controller 14 can couple write data to the DRAM devices 20–26 at the same time that the memory devices 20–26 are coupling read to the memory controller 14.

Figure 2:
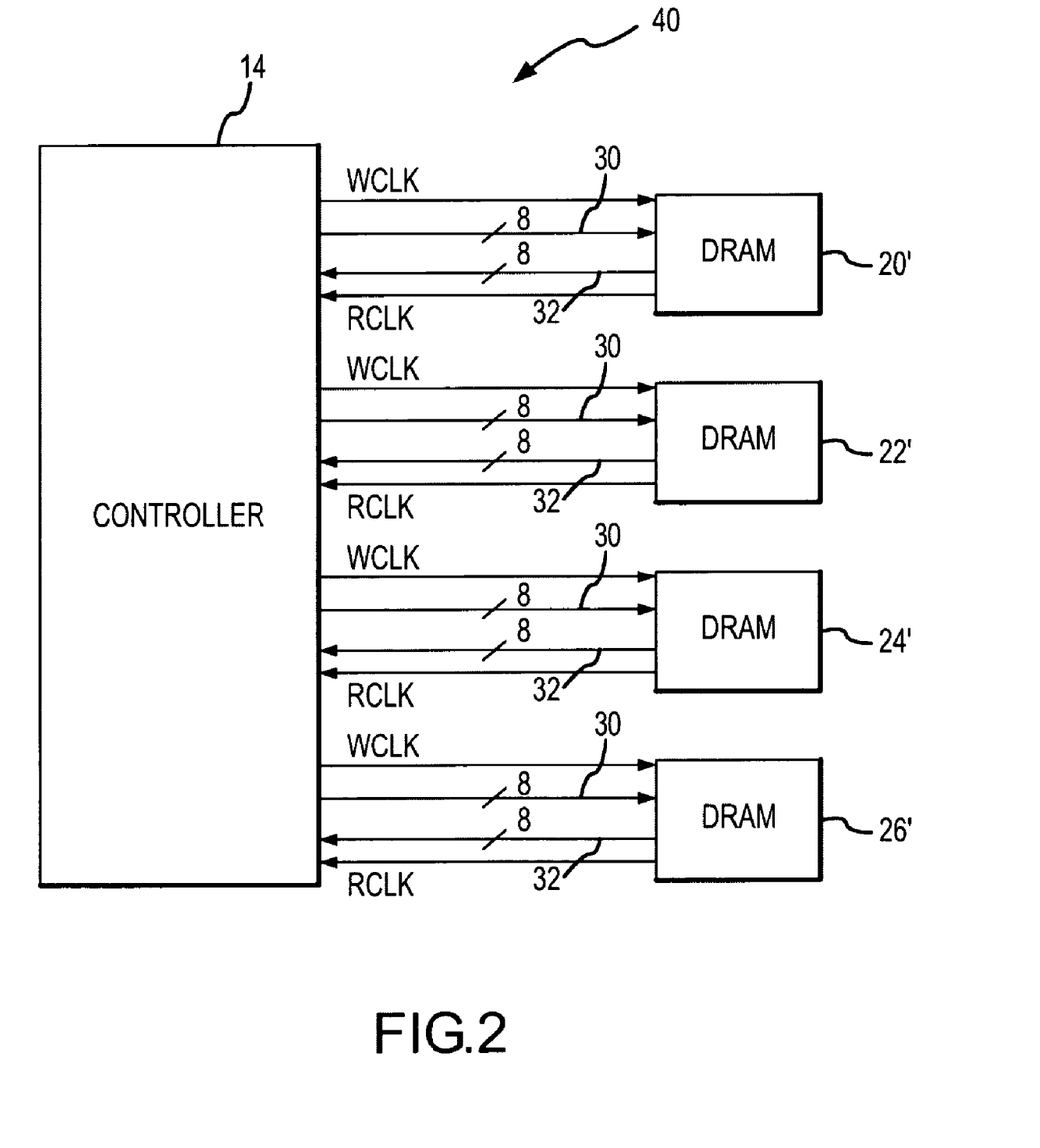
FIG. 2 is a block diagram of a memory system according to another example of the present invention.

A memory system 40 according to another example of the invention is illustrated in FIG. 2. The memory system 40 of FIG. 2 is substantially identical to the memory system 10 of FIG. 1. Therefore, in the interests of brevity, the components that are common to both memory systems 10, 40 have been provided with the same reference numerals, and a description of their structure and operation will not be repeated. The memory system 40 differs from the memory system 10 of FIG. 1 by using synchronous DRAM ("SDRAM") devices 20'–26' devices, which perform operations in synchronism with a clock signal. In the memory system 40 of FIG. 2, the memory controller 14 couples a write clock ("WCLK") signal to the each of the SDRAM devices 20'–26' with each of the write data. The WCLK signal is used to capture the write data in the SDRAM device 20'–26' to which the write memory access is directed. In the memory system 40 of FIG. 2, the WCLK signal has transitions that occur substantially in the middle of when the corresponding write data are valid. Also, the SDRAM devices 20'–26' may be double data rate ("DDR") devices in which write data is latched responsive to both the rising edge and the falling edge of the WCLK signal. However, other relationships between the phase and number of transitions of the WCLK signal and the write data may be used.

In a similar manner, each of the SDRAM devices 20'–26' couple a read clock ("RCLK") signal to the memory controller 14 each time read data are coupled from the SDRAM device 20'–26' to the memory controller 14. The RCLK signal is used by the memory controller 14 to capture the read data. In the memory system 40 of FIG. 2, the RCLK signal has transitions that occur at substantially the beginning and edge of the period when the corresponding read data are valid. Since the SDRAM devices 20'–26' are double data rate ("DDR") devices, the read data is latched in the memory controller 14 responsive to both the rising edge and the falling edge of the RCLK signal. Again, the RCLK signal may have other relationships with the phase and number of transitions of the read data.

Figure 3:
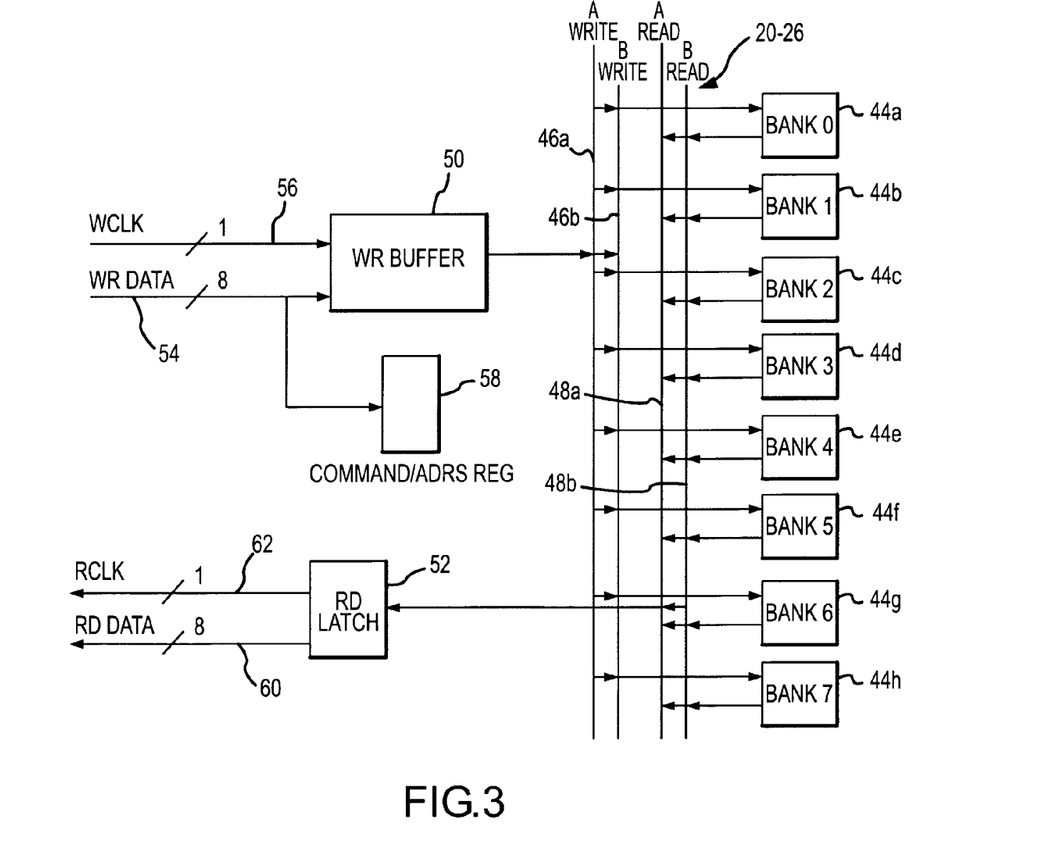
FIG. 3 is a block diagram of a portion of a dynamic random access memory device that may be used in the memory systems of FIGS. 1 and 2.

A portion of the SDRAM devices 20'–26' are shown in greater detail in FIG. 3. Each of the DRAM devices 20'–26' includes eight memory banks 44a–h each of which are coupled to a pair of internal write data buses 46a,b and a pair of internal read data buses 48a,b. The write data buses 46a,b receive write data from a write buffer 50, and the read data buses 48a,b couple read data to a read latch 52. Write data is coupled to the write buffer 50 through a write data bus 54 and is latched into the buffer 50 by a clock signal coupled through line 56. Memory commands and addresses are also coupled through the write data bus 54, and they are stored in a command/address register 58.

The read latch 52 outputs read data on an 8-bit read data bus 60 in synchronism with a clock signal that is also coupled from the read latch 52 on line 62. The memory devices 20'–26' include a large number of other conventional memory device components, but these have been omitted from FIG. 3 in the interest of brevity and clarity.

In operation, memory commands, such as write commands and read commands, as well as memory addresses are coupled through the write data bus 54. The memory commands and addresses are stored in the command/address register 58. The write data is also coupled through the write data bus 54 and stored in the write buffer 50. In response to a read command coupled to the command/address register 58, the memory devices 20'–26' output read data, which are coupled to the read latch 52. The read latch 52 stores the read data until the read data bus 60 and memory controller 14 (FIG. 1) are able to receive the read data. The read data are then clocked out of the read latch 52 through the read data bus 60. The read memory accesses are preferably given priority over write memory accesses so that a number of write commands and associated addresses are stored in the command/address register 58 while the write data are accumulated in the write buffer 48. When a sufficient number of write accesses have been accumulated, they can be processed sequentially without any intervening read accesses. As a result, the latency penalties inherent in read/write turnarounds are avoided.

The use of two write data buses 46a,b makes it possible to couple write data to one of the banks 44a–h concurrently with the coupling of write data to another one of the banks 44a–h. Similarly, the use of two read data buses 48a,b makes it possible to couple read data from one of the banks 44a–h concurrently with the coupling of read data from another one of the banks 44a–h. Furthermore, it is possible to couple write data to one of the banks 44a–h concurrently with the coupling of read data from another one of the banks 44a–h. It is even possible to concurrently couple write data to two banks 44a–h at the same time that read data are being concurrently coupled from two different banks 44a–h. Other combinations of data coupling will be apparent to one skilled in the art. As a result, as explained in greater detail below, bank interleaving may be accomplished concurrently in the memory devices 20–26. Also, by allowing a read command to be coupled through the write data bus 54 and stored in the command/address register 58, read commands can be coupled to the memory devices 20–26 during write or read operation. As a result, the latency for read operations is minimized. Otherwise, it would be necessary to wait for a write operation to be completed before a read command could be sent.

Each of the DRAM devices 20–26 is substantially identical to the SDRAM devices 20'–26' shown in FIG. 3 except that a WCLK signal is not coupled to the write buffer 50 through the line 56, and a RCLK signal is not coupled from the read latch 52 through the line 62.

In one embodiment of the invention, the memory controller 14 (FIG. 1) simply issues read and write memory commands and addresses to the memory devices 20–26 and 20'–26'. The memory commands are stored in the command/address register 58 until the memory devices 20–26 and 20'–26' are able to process them. The commands are then processed by each of the memory devices 20–26 and 20'–26'. The memory devices 20–26 and 20'–26' may also couple a read response or a write response to the memory controller 14 through the read data bus 60. The read responses and write responses indicate to the memory controller 14 that processing of a corresponding memory request has been completed. The responses uniquely identify the memory request corresponding to the response so that it is not necessary for the memory controller 14 to keep track of the memory requests, and the memory requests may be processed out-of-order. In the case of a read response, the read response may also include the read data resulting from the corresponding read request.

Figure 4:
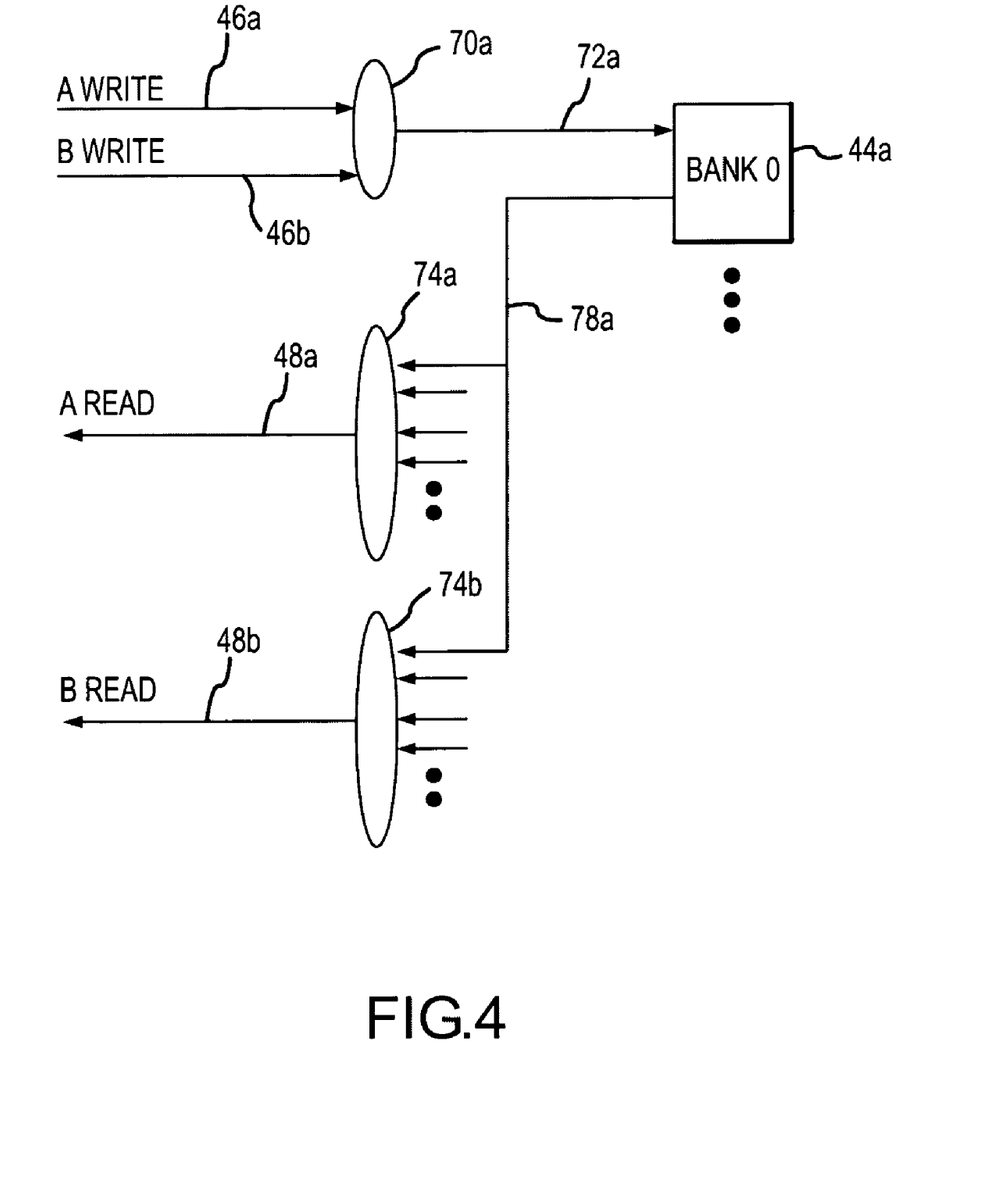
FIG. 4 is a schematic diagram showing one example of a connection between a memory bank in the memory device of FIG. 3 and dual write and read data buses.

One example of a circuit for coupling the banks 44a–h to the internal write data buses 46a,b and to the internal read data buses 48a,b is shown in FIG. 4. The internal write data buses 46a,b are coupled to respective inputs of a multiplexer 70a. Although not shown in FIG. 4, one multiplexer 70a–h is provided for each of the banks 44a–h, respectively, and all of the multiplexers 70a–h have their inputs coupled to both of the internal write data buses 46a,b. Each of the multiplexers 70a–h has its output coupled to its respective bank 44a–h through a single respective bank write bus 72a–h. The multiplexers 70a–h are operated by control signals (not shown in FIG. 4) so that either of the internal write data buses 46a,b can be coupled to any of the banks 44a–h.

The internal read data buses 48a,b are coupled to the banks 44a–h in a manner that is somewhat different from the manner in which the write data buses 46a,b are coupled to the banks 44a–h. Each of two multiplexers 74a,b has its output coupled to a respective one of the internal read data buses 48a,b. Corresponding inputs to the multiplexers 74a,b are coupled to each other and to a respective one of the banks 44a–h by a single respective bank read bus 78a–h. Thus, a respective input to each of the multiplexers 74a–b is provided for each of the banks 44a–h. The multiplexers 74a–b are operated by control signals (not shown in FIG. 4) so that any of the banks 44a–h may be coupled to either of the internal read data buses 48a,b.

Figure 5:
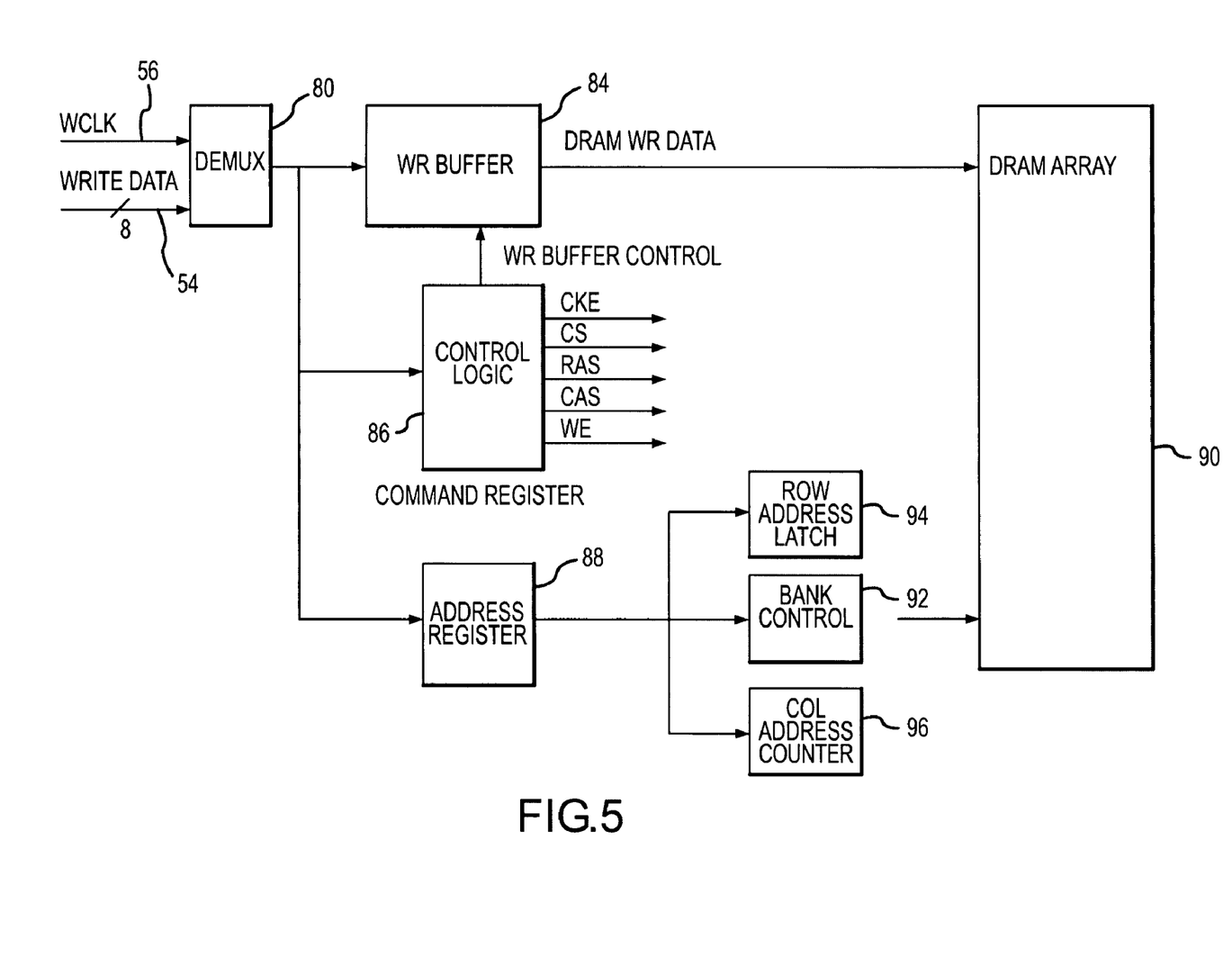
FIG. 5 is a block diagram showing one example for obtaining command and address signals from a write data bus coupled to the memory device of FIG. 3.

A portion of the circuitry in the SDRAM devices 20'–26' shown in FIG. 3 is shown in greater detail in FIG. 5. The write data bus 54 and the clock line 56 are coupled to respective inputs of a demultiplexer 80, which routes the write data to a write buffer 84, the memory commands to a command register 86, and memory addresses to an address register 88. The command register 86 includes control logic to decode memory commands and output corresponding control signals, some of which are shown in FIG. 5. The write buffer 84 stores write data for one or more write memory accesses, and then couples the write data to a DRAM array 90 at an appropriate time that is determined by control signals output from the control logic in the command register 86. The DRAM array 90 includes the dual internal write data buses 46a,b, the dual internal read data buses 48a,b and the banks 44a–h shown in FIG. 3. The DRAM array 90 also includes the multiplexers 70a–h and 74a,b shown in FIG. 4. Thus, the write data from the write buffer 84 is coupled to the banks 44a–h. The write data for sequential write accesses are preferably coupled to different banks 44a–h so that the write data from both write accesses can be stored concurrently.

The address register 88 stored memory addresses that are coupled through the write data bus 56 along with a memory command and, in the case of a write request, write data. The address register 88 couples address bits corresponding to a bank address to bank control circuitry 92, address bits corresponding to a row address to a row address latch 94, and address bits corresponding to a column address to a column address counter 96. The bank control circuitry 92 causes the write data or read data to be coupled to or from a selected one of the banks 44a–h, and a row address stored in the latch 94 opens a corresponding row in the selected bank 44a–h. The column address applied to the counter 96 sets the initial count of an internal counter, which is then output to the selected bank 44a–h.

Figure 6:
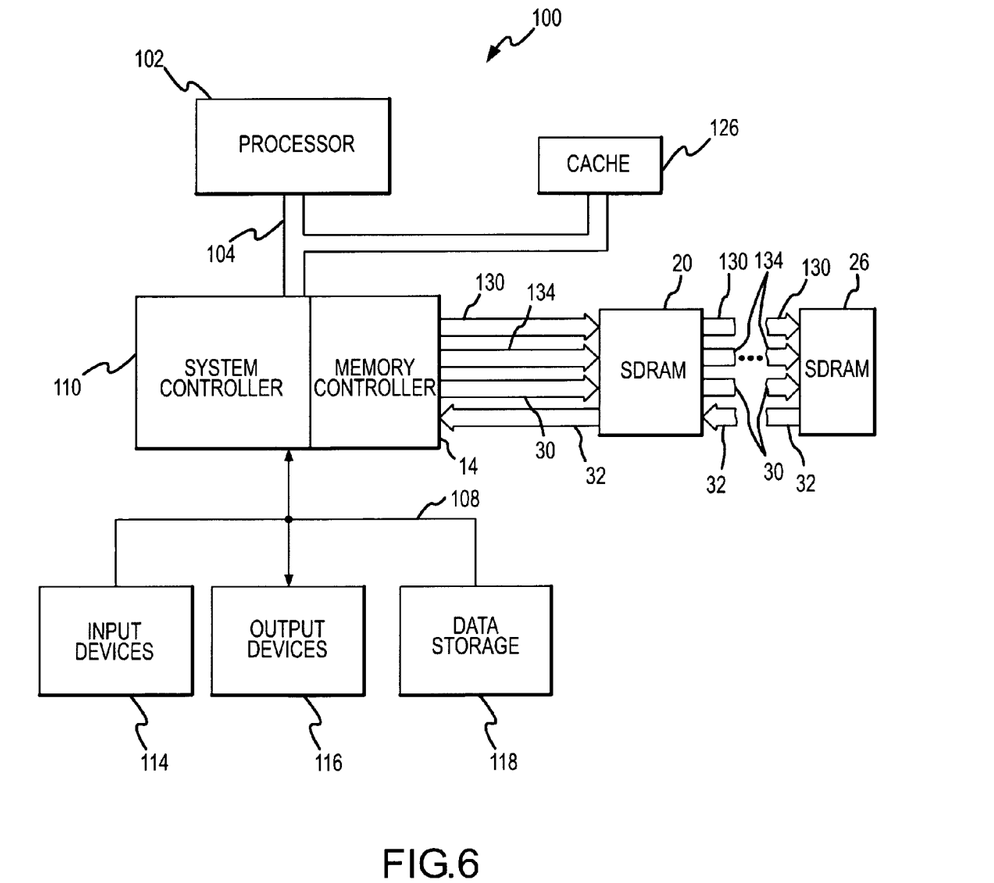
FIG. 6 is a block diagram of a computer system using the memory system of FIG. 1 or 2 or some other example of the invention.

A computer system 100 using the memory system 10 of FIG. 1, the memory system 40 of FIG. 2 or a memory system according to some other example of the present invention is shown in FIG. 6. The computer system 100 includes a processor 102 for performing various computing functions, such as executing specific software for performing specific calculations or tasks. The processor 102 includes a processor bus 104 that normally includes an address bus, a control bus, and a data bus. The processor bus is coupled to an expansion bus 108, such as a peripheral component interconnect ("PCI") bus, through a system controller 110. The computer system 100 includes one or more input devices 114, such as a keyboard or a mouse, coupled to the processor 102 through the expansion bus 108, system controller 110 and processor bus 104 to allow an operator to interface with the computer system 100. Typically, the computer system 100 also includes one or more output devices 116 coupled to the expansion bus 108, such output devices typically being a printer or a video terminal. One or more mass data storage devices 118 are also typically coupled to the expansion bus 108 to store data or retrieve data from external storage media (not shown). Examples of typical mass data storage devices 118 include hard and floppy disks, tape cassettes, and compact disk read-only memories (CD-ROMs). The processor 102 is also typically coupled to a cache memory 126, which is usually static random access memory ("SRAM"). As mentioned above, the computer system 100 also includes a memory system, such as the memory system 10 or 40. Specifically, the system controller 110 includes the memory controller 14, which, as explained above with reference to FIGS. 1 and 2, is coupled to several DRAM devices 20–26 or 20'–26'. The memory controller 14 is coupled to each of the DRAM devices 20–26 or 20'–26' through the write data bus 30 and the read data bus 32 as well as a command bus 130 and an address bus 134.

Although the present invention has been described with reference to the disclosed embodiments, persons skilled in the art will recognize that changes may be made in form and detail without departing from the spirit and scope of the invention. Such modifications are well within the skill of those ordinarily skilled in the art. Accordingly, the invention is not limited except as by the appended claims.

I claim:

1. A memory system, comprising:
    a memory controller having a plurality of output terminals and a plurality of input terminals;
    at least one memory device having a plurality of output terminals and a plurality of input terminals, the at least one memory device comprising:
        a plurality of banks of memory cells operable to store write data responsive to a write command and output read data responsive to a read command;
        at least one pair of internal write data buses each of which couples the input terminals of the memory device to each of the banks of memory cells;
        at least one pair of internal read data buses each of which couples the output terminals of the memory device to each of the banks of memory cells, the internal read data buses being isolated from the internal write data buses;
        a write data selection circuit coupled to the internal write data buses and each of the banks, the write data selection circuit being operable to selectively couple each of the internal write data buses to any of the banks;
        a read data selection circuit coupled to the internal read data buses and each of the banks, the read data selection circuit being operable to selectively couple any of the banks to each of the internal read data buses;
        an addressing circuit operable to select one of the banks for a read or write memory access and to select a row and column of memory cells in the selected bank; and
        a command decoder operable to receive and decode memory commands and to generate control signals corresponding to the memory commands, at least some of the control signals controlling with write data selection circuit to cause write data to be coupled from the input terminals of the memory device to a selected bank through either of the internal write data buses and at least some of the control signals controlling the read data selection circuit to cause read data to be coupled from a selected bank to the input terminals of the memory device through either of the internal read data buses;
    a downstream bus coupling the output terminals of the memory controller to the input terminals of the memory device, the downstream bus being isolated from the input terminals of the memory controller and the output terminals of the memory device; and
    an upstream bus coupling the output terminals of the memory device to the input terminals of the memory controller, the upstream bus being isolated from the output terminals of the memory controller and the input terminals of the memory device.

2. The memory system of claim 1 wherein the memory device further comprises a write buffer coupled to the input terminals of the memory device, the write buffer being operable to store write data from at least one write request and to couple the write data from the write buffer to either of the internal write data buses for storage in one of the banks.

3. The memory system of claim 2 wherein the write buffer is operable to couple the write data from the write buffer to one of the banks through either of the internal write data buses concurrently with read data being coupled from another of the banks to one of the internal read data buses.

4. The memory system of claim 1 wherein the control signals generated by the command decoder are operable to cause write data to be coupled from the input terminals of the memory device to a selected bank through either of the internal write data buses concurrently with causing read data to be coupled from a selected bank to the input terminals of the memory device through either of the internal read data buses.

5. The memory system of claim 1 wherein the control signals generated by the command decoder are operable to cause write data to be coupled to a selected bank from one of the internal write data buses concurrently with causing write data to be coupled to a different selected bank from another one of the internal write data buses.

6. The memory system of claim 1 wherein the control signals generated by the command decoder are operable to cause read data to be coupled from a selected bank to one of the internal read data buses concurrently with causing read data to be coupled from a different selected bank to another one of the internal read data buses.

7. The memory system of claim 1 wherein the memory device further comprises a command/address register coupled to the input terminals of the memory device, the command/address register being operable to store the memory commands and the row and column addresses coupled to the memory device through the downstream bus.

8. The memory system of claim 1 wherein the banks of memory cells comprise banks of dynamic random access memory cells.

9. The memory system of claim 7 wherein the memory controller is further operable to output a clock signal, and the memory device comprises a synchronous dynamic random access memory device and includes a clock input terminal, the memory system further comprising a clock signal line coupling the clock signal from the memory controller to the clock input of the memory device.

10. The memory system of claim 1 wherein the write data selection circuit comprises a write multiplexer for each of the banks, each of the write multiplexers having a plurality of inputs coupled to the respective internal write data buses and an output coupled to the respective bank.

11. The memory system of claim 1 wherein the read data selection circuit comprises a read multiplexer for each of the internal read data buses, each of the read multiplexers having an plurality of inputs coupled to the respective banks and on output coupled to the respective internal read data bus.

12. A memory device, comprising:
  having a plurality of output terminals and a plurality of input terminals, the at least one memory device comprising:
  a plurality of banks of memory cells operable to store write data responsive to a write command and output read data responsive to a read command;
  at least one pair of internal write data buses each of which couples a plurality of memory device input terminals to each of the banks of memory cells;
  at least one pair of internal read data buses each of which couples a plurality of memory device output terminals to each of the banks of memory cells, the internal read data buses being isolated from the internal write data buses;
  a write data selection circuit coupled to the internal write data buses and each of the banks, the write data selection circuit being operable to selectively couple each of the internal write data buses to any of the banks;
  a read data selection circuit coupled to the internal read data buses and each of the banks, the read data selection circuit being operable to selectively couple any of the banks to each of the internal read data buses;
  an addressing circuit operable to select one of the banks for a read or write memory access and to select a row and column of memory cells in the selected bank; and
  a command decoder operable to receive and decode memory commands and to generate control signals corresponding to the memory commands, at least some of the control signals controlling with write data selection circuit to cause write data to be coupled from the input terminals of the memory device to a selected bank through either of the internal write data buses and at least some of the control signals controlling the read data selection circuit to cause read data to be coupled from a selected bank to the input terminals of the memory device through either of the internal read data buses.

13. The memory device of claim 12 wherein the memory device further comprises a write buffer coupled to the input terminals of the memory device, the write buffer being operable to store write data from at least one write request and to couple the write data from the write buffer to either of the internal write data buses for storage in one of the banks.

14. The memory device of claim 13 wherein the write buffer is operable to couple the write data from the write buffer to one of the banks through either of the internal write data buses concurrently with read data being coupled from another of the banks to one of the internal read data buses.

15. The memory device of claim 12 wherein the control signals generated by the command decoder are operable to cause write data to be coupled from the input terminals of the memory device to a selected bank through either of the internal write data buses concurrently with causing read data to be coupled from a selected bank to the input terminals of the memory device through either of the internal read data buses.

16. The memory device of claim 12 wherein the control signals generated by the command decoder are operable to cause write data to be coupled to a selected bank from one of the internal write data buses concurrently with causing write data to be coupled to a different selected bank from another one of the internal write data buses.

17. The memory device of claim 12 wherein the control signals generated by the command decoder are operable to cause read data to be coupled from a selected bank to one of the internal read data buses concurrently with causing read data to be coupled from a different selected bank to another one of the internal read data buses.

18. The memory device of claim 12 wherein the memory device further comprises a command/address register coupled to the memory device input terminals, the command/address register being operable to store the memory commands and the row and column addresses coupled to the memory device input terminals.

19. The memory device of claim 12 wherein the banks of memory cells comprise banks of dynamic random access memory cells.

20. The memory device of claim 19 wherein the memory device comprises a synchronous dynamic random access memory device.

21. The memory device of claim 12 wherein the write data selection circuit comprises a write multiplexer for each of the banks, each of the write multiplexers having a plurality of inputs coupled to the respective internal write data buses and an output coupled to the respective bank.

22. The memory device of claim 12 wherein the read data selection circuit comprises a read multiplexer for each of the internal read data buses, each of the read multiplexers having an plurality of inputs coupled to the respective banks and on output coupled to the respective internal read data bus.

23. A processor-based system, comprising:
  a processor having a processor bus;
  an input device coupled to the processor through the processor bus to allow data to be entered into the computer system;
  an output device coupled to the processor through the processor bus to allow data to be output from the computer system;
  a mass data storage device coupled to the processor through the processor bus to allow data to be read from the mass storage device;
  a memory controller coupled to the processor through the processor bus, the memory controller having a plurality of output terminals and a plurality of input terminals;
  at least one memory device having a plurality of output terminals and a plurality of input terminals, the at least one memory device comprising:
    a plurality of banks of memory cells operable to store write data responsive to a write command and output read data responsive to a read command;
    at least one pair of internal write data buses each of which couples the input terminals of the memory device to each of the banks of memory cells;
    at least one pair of internal read data buses each of which couples the output terminals of the memory device to each of the banks of memory cells, the internal read data buses being isolated from the internal write data buses;

a write data selection circuit coupled to the internal write data buses and each of the banks, the write data selection circuit being operable to selectively couple each of the internal write data buses to any of the banks;

a read data selection circuit coupled to the internal read data buses and each of the banks, the read data selection circuit being operable to selectively couple any of the banks to each of the internal read data buses;

an addressing circuit operable to select one of the banks for a read or write memory access and to select a row and column of memory cells in the selected bank; and a command decoder operable to receive and decode memory commands and to generate control signals corresponding to the memory commands, at least some of the control signals controlling with write data selection circuit to cause write data to be coupled from the input terminals of the memory device to a selected bank through either of the internal write data buses and at least some of the control signals controlling the read data selection circuit to cause read data to be coupled from a selected bank to the input terminals of the memory device through either of the internal read data buses;

a downstream bus coupling the output terminals of the memory controller to the input terminals of the memory device, the downstream bus being isolated from the input terminals of the memory controller and the output terminals of the memory device; and an upstream bus coupling the output terminals of the memory device to the input terminals of the memory controller, the upstream bus being isolated from the output terminals of the memory controller and the input terminals of the memory device.

24. The processor-based system of claim 23 wherein the memory device further comprises a write buffer coupled to the input terminals of the memory device, the write buffer being operable to store write data from at least one write request and to couple the write data from the write buffer to either of the internal write data buses for storage in one of the banks.

25. The processor-based system of claim 24 wherein the write buffer is operable to couple the write data from the write buffer to one of the banks through either of the internal write data buses concurrently with read data being coupled from another of the banks to one of the internal read data buses.

26. The processor-based system of claim 23 wherein the control signals generated by the command decoder are operable to cause write data to be coupled from the input terminals of the memory device to a selected bank through either of the internal write data buses concurrently with causing read data to be coupled from a selected bank to the input terminals of the memory device through either of the internal read data buses.

27. The processor-based system of claim 23 wherein the control signals generated by the command decoder are operable to cause write data to be coupled to a selected bank from one of the internal write data buses concurrently with causing write data to be coupled to a different selected bank from another one of the internal write data buses.

28. The processor-based system of claim 23 wherein the control signals generated by the command decoder are operable to cause read data to be coupled from a selected bank to one of the internal read data buses concurrently with causing read data to be coupled from a different selected bank to another one of the internal read data buses.

29. The processor-based system of claim 23 wherein the memory device further comprises a command/address register coupled to the input terminals of the memory device, the command/address register being operable to store the memory commands and the row and column addresses coupled to the memory device through the downstream bus.

30. The processor-based system of claim 23 wherein the banks of memory cells comprise banks of dynamic random access memory cells.

31. The processor-based system of claim 30 wherein the memory controller is further operable to output a clock signal, and the memory device comprises a synchronous dynamic random access memory device and includes a clock input terminal, the memory system further comprising a clock signal line coupling the clock signal from the memory controller to the clock input of the memory device.

32. The processor-based system of claim 23 wherein the write data selection circuit comprises a write multiplexer for each of the banks, each of the write multiplexers having a plurality of inputs coupled to the respective internal write data buses and an output coupled to the respective bank.

33. The processor-based system of claim 23 wherein the read data selection circuit comprises a read multiplexer for each of the internal read data buses, each of the read multiplexers having an plurality of inputs coupled to the respective banks and on output coupled to the respective internal read data bus.

* * * * *